United States Patent [19]
Hokari

[11] Patent Number: 5,212,691
[45] Date of Patent: May 18, 1993

[54] PRIVATE NETWORK WITH MEANS FOR ESTABLISHING VIRTUAL TIE TRUNKS BETWEEN PBXS THROUGH ISDN PUBLIC NETWORK

[75] Inventor: Makoto Hokari, Tokyo, Japan
[73] Assignee: NEC Corporation, Tokyo, Japan
[21] Appl. No.: 784,507
[22] Filed: Oct. 30, 1991
[30] Foreign Application Priority Data
Oct. 30, 1990 [JP] Japan ................................. 2-292835
[51] Int. Cl.⁵ ............................................. H04J 3/12
[52] U.S. Cl. ................................... 370/110.1; 370/54; 379/220; 379/221; 379/229; 379/230; 379/231; 379/232; 379/233; 379/234
[58] Field of Search ............... 370/110.1, 54; 379/220, 379/221, 229–234

[56] References Cited
U.S. PATENT DOCUMENTS
4,348,554  9/1982  Asmuth ........................... 379/221 X
4,791,665 12/1988  Bogart et al. .................... 379/221 X
5,031,211  7/1991  Nagai et al. ...................... 379/221

Primary Examiner—Douglas W. Olms
Assistant Examiner—Russell W. Blum
Attorney, Agent, or Firm—Whitham & Marhoefer

[57] ABSTRACT

In a private network where PBXs (1, 2) are connected through a primary rate interface (47, 48) to an ISDN network (45), one of the PBXs has routing data for virtual tie trunks for signaling and speech transmission, respectively, to be established via the ISDN to a distant PBX (2), and channel status data indicating their set-up or clear-down state according to time of day and calendar day. The stored data is periodically accessed, and depending on the contents of the channel status data, a call setup or clearing message is sent from the PBX (1) to the ISDN to set-up or clear-down the virtual tie trunks. On receipt of a response from the distant PBX, busy/idle status of the virtual tie trunks is changed according to the accessed channel status data. In response to a request from a user station, a path is established therefrom to the virtual speech tie trunk and a call setup message is sent direct to the distant PBX through the virtual signaling tie trunk.

8 Claims, 5 Drawing Sheets

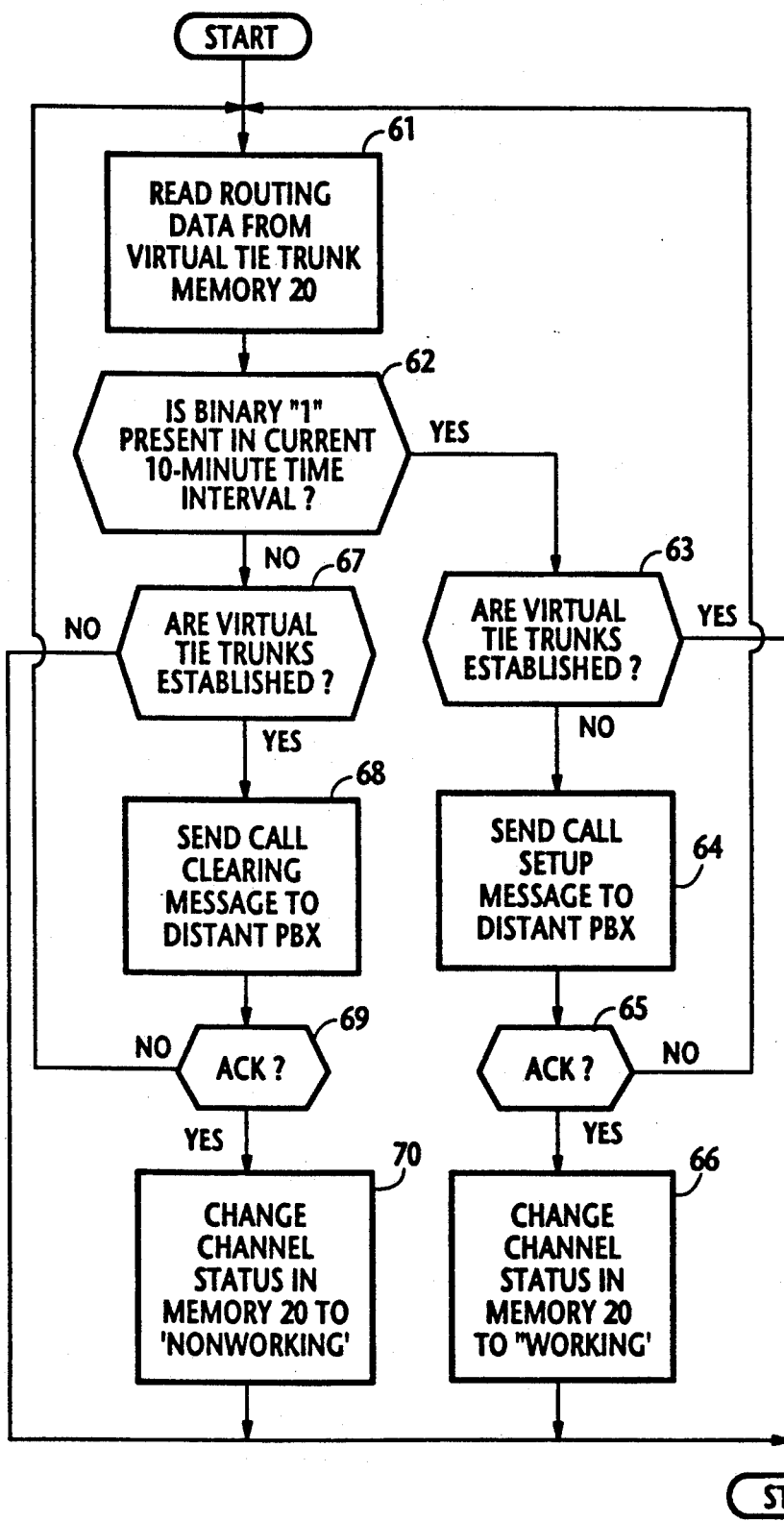
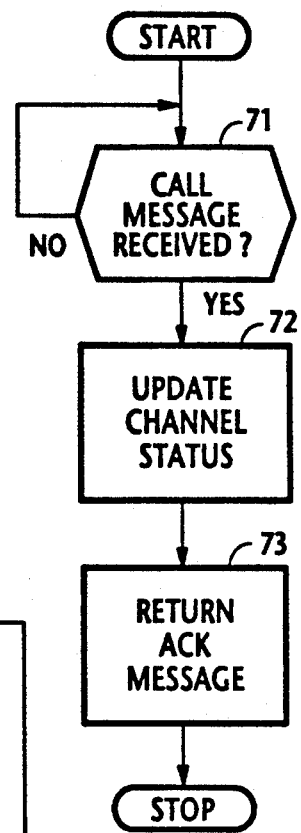

PRIVATE NETWORK WITH MEANS FOR ESTABLISHING VIRTUAL TIE TRUNKS BETWEEN PBXS THROUGH ISDN PUBLIC NETWORK

BACKGROUND OF THE INVENTION

The present invention relates to a private switched communications system having at least two PBX systems connected through CCITT primary rate interfaces to an ISDN (Integrated Services Digital Network) public network.

With current private switched networks, the number of dedicated or leased tie trunks between PBXs (private branch exchanges) is usually determined to meet peak traffic load. However, the amount of business traffic varies significantly during the day as well as from day to day, and hence the cost performance of the tie trunks is low.

It is thus desirable to establish tie trunks between PBXs on an as-needed basis to cost-effectively meet varying traffic volume.

SUMMARY OF THE INVENTION

It is therefore an object of the present invention to provide a private switched communications system which can establish virtual tie trunks between two PBX systems by way of an ISDN public network in response to a time schedule prepared in accordance with the varying patterns of estimated traffic between the PBX systems.

According to the present invention, there is provided a private switched communications system having first and second PBX (private branch exchange) systems connected through a respective primary rate interface to an ISDN (Integrated Services Digital Network) public network. In the first PBX system, routing data is stored in memory identifying a virtual signaling tie trunk and a virtual speech tie trunk to be established by speech channels of the primary rate interface. Further stored in the memory are first channel status data indicating set-up/clear-down command status of the virtual signaling and speech tie trunks, and second channel status data indicating working/nonworking status of the virtual tie trunks, wherein the first channel status data is variable as a function of time and as a function of calendar day. A controller accesses the first channel status data at periodic intervals, and transmits a call setup message or a call clearing message to the ISDN public network through a signaling channel of the primary rate interface to set-up or clear-down the virtual signaling and speech tie trunks between the first and second PBX systems according to contents of the first channel status data. Upon receipt of a response message from the distant PBX system, the working/nonworking status of the virtual signaling and speech tie trunks in the memory is changed according to the first channel status data. When a call request is placed by a user station in the first PBX system, a path is established in the first PBX system from one of the user stations to the near end of the virtual speech tie trunk if the status of the virtual speech tie trunk is indicative of the working state, and a call setup message is sent to the second PBX system through the virtual signaling tie trunk to allow a path to be established from the far end of the virtual speech tie trunk to a destination user station of the second PBX system.

BRIEF DESCRIPTION OF THE DRAWINGS

The present invention will be described in further detail with reference to the accompanying drawings, in which:

FIG. 4A is a flowchart describing instructions performed by the controller of a master-side PBX system;

FIG. 4B is a flowchart of instructions performed by the controller of a subordinate-side PBX system.

DETAILED DESCRIPTION

Figure 1:
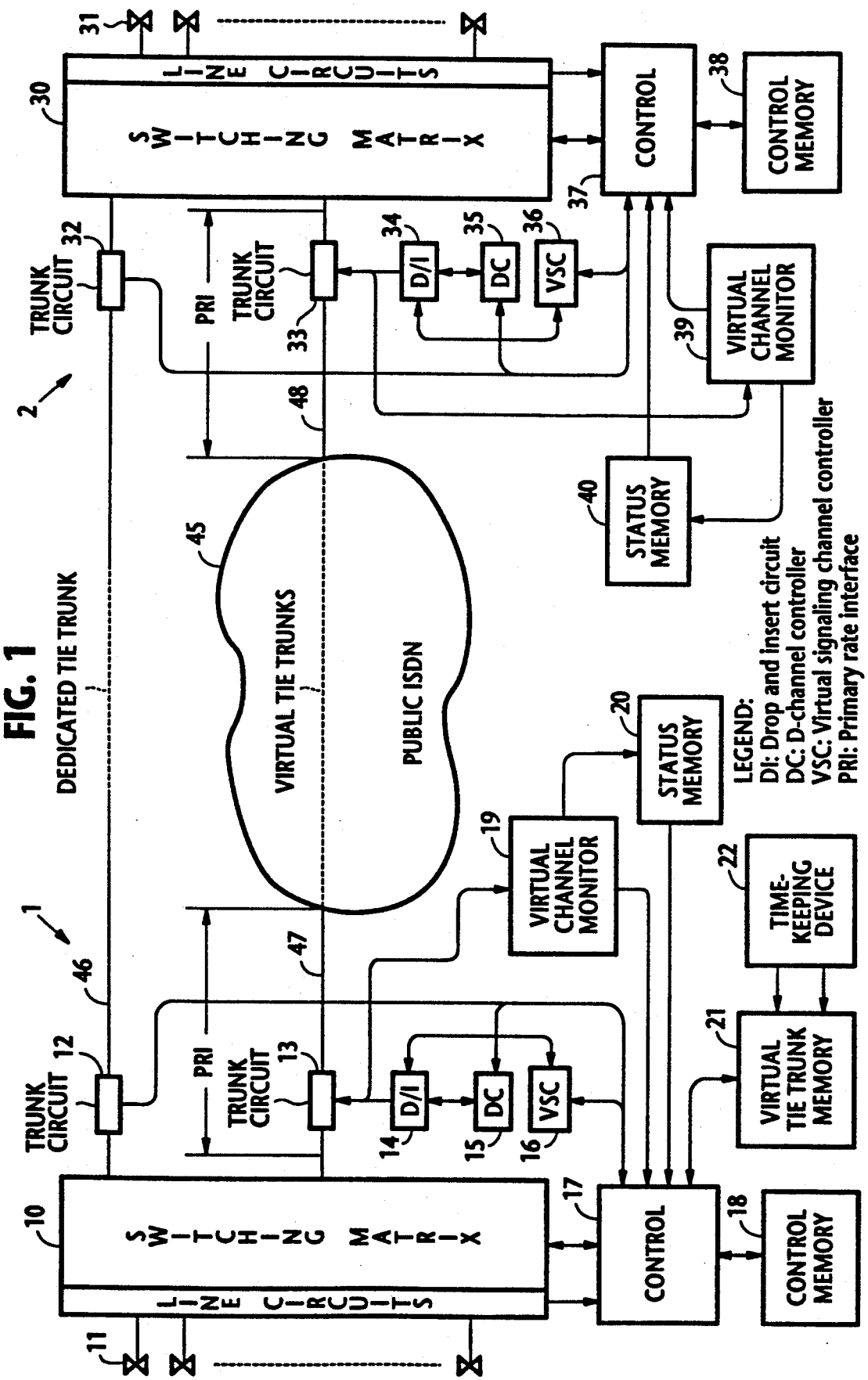
FIG. 1 is a block diagram of a private switched network comprising two PBX systems interconnected by an ISDN network.

As represented in FIG. 1, a private switched network of the present invention comprises PBX (private branch exchange) switching systems 1 and 2 interconnected by a dedicated tie trunk 46 and a CCITT-I. Series primary rate interface (PRI) trunks 47 and 48 both terminating at the periphery of the ISDN public network 40. According to the CCITT I-Series Recommendations, each of the PRI trunks has 23 basic-rate channels (64 kbps time slots, or B-channels) and one signaling channel (64-kbps time slot, or D-channel), and is known as a (23B+D) channel. From the network management viewpoint of the private system, PBX systems 1 and 2 serve as a master-side and a subordinate-side of the network, respectively.

The master-side PBX system 1 comprises a switching matrix 10 having line circuits to which telephone stations 11 are connected and the subordinate-side PBX system 2 comprises a switching matrix 30 having line circuits to which telephone stations 31 are connected. On the master-side of the system, the dedicated tie trunk 46 terminates at a trunk circuit 12 and on the other side it terminates at a trunk circuit 33 to allow direct interworking between PBX systems 1 and 2. The PBX side of PRI trunk 47 terminates at a PRI trunk circuit 13 and the other side of it terminates to a nearby switching office of the ISDN network, and the PBX side of PRI trunk 48 terminates at a PRI trunk circuit 33 and the other side of it terminates at a switching office of the ISDN network. Trunk circuits 12 and 13 are connected to the trunk terminals of switching matrix 10, and trunk circuits 32 and 33 are connected to the trunk terminals of switching matrix 30. For purposes of simplicity, other trunk circuits such as intraoffice trunk circuits and service trunk circuits are omitted.

Figure 2:
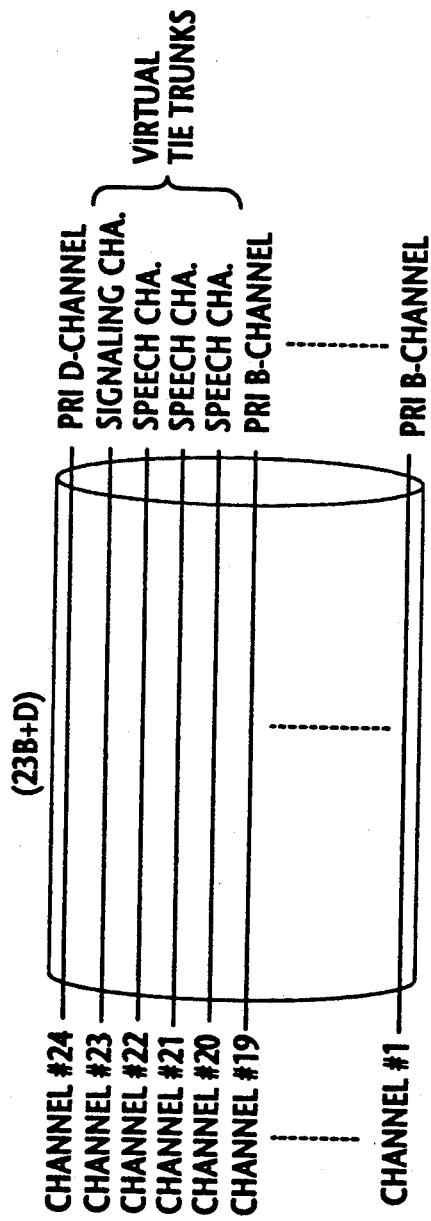
FIG. 2 is a sketch showing details of a typical example of a primary rate interface.

As shown in FIG. 2, PRI B-channels #1 through #19 are permanently assigned for use as speech channels for communications between PBX 1 and ISDN 45 and for communications between PBX 2 and the ISDN, and channels #20, #21 and #22 are assigned for use as 'virtual tie trunks' to be established by the ISDN between PBX 1 and 2 for use as speech channels in a manner as will be described. Channel #23 is used as virtual signaling channel for transmitting signaling messages associated with the virtual channels #20, #21 and #22. Channel #24 is the D-channel of the primary rate interface trunks 47 and 48.

PBX 1 has a drop-and-insert circuit 14 which is associated with PRI trunk circuit 13 to insert digital speech signals into a specified one of the 23 B-channels of the PRI trunk 47 or drop it from the trunk, and PBX 2 has a similar drop-and-insert circuit 34 associated with PRI trunk circuit 33. To the drop-and-insert circuit 14 is coupled a D-channel controller 15 which controls the D-channel of the primary rate trunk 47 for signaling purposes associated with the B-channels #1 through #19. The D-channel controller 15 is also used to set up or clear down the virtual tie trunks. In a similar manner, a D-channel controller 35 is coupled to drop-and-insert circuit 34 for transmitting signaling messages associated with the virtual tie trunks.

Drop-and-insert circuit 14 is further associated with a virtual signaling channel controller 16 which provides signaling functions for calls directed on the virtual tie trunks from PBX 1 to PBX 2. Likewise, drop-and-insert circuit 34 is associated with a virtual signaling channel controller 36 to provide signaling functions for calls directed on the virtual tie trunks from PBX 2 to PBX 1.

PBX system 1 has a controller 17 connected to the line circuits of switching matrix 10 as well as to trunk circuits 12, 13 to receive call originating and terminating requests and establishes switched paths between the line and trunk sides of the switching matrix 10 according to an algorithm known in the telephone switching art by using busy/idle status of all user stations and all channels of the trunks stored in a control memory 18. Likewise, PBX system 2 has a controller 37 which is connected to the line circuits of switching matrix 30 as well as to trunk circuits 32, 33 to establish paths in the switching matrix 30 using busy/idle status data stored in a control memory 38.

PBX 1 has a virtual channel monitor circuit 19 that is associated with trunk circuit 13 to cooperate with the ISDN network 45 to check the working or nonworking status of the virtual tie trunks, and PBX 2 has likewise a virtual channel monitor circuit 39 that is associated with trunk circuit 33 to check the working or nonworking status of the virtual tie trunks with the ISDN. In PBX 1, a channel status memory 20 is associated with the virtual channel monitor 19 to store the working/nonworking status of the virtual tie trunks. In like manner, PBX 2 has a channel status memory 40 associated with the virtual channel monitor 39 to store the working/nonworking status of the virtual tie trunks.

The master-station PBX system 1 differs from the other PBX in that it includes a virtual tie trunk memory 21 in which routing data for all virtual tie trunks are stored. Since traffic demands for tie trunks vary with time of day as well as with time of month and year, a different set of virtual tie trunks is stored in the memory 21 at 10-minute intervals. To this end, a time-keeping device 22 is provided for supplying calendar (day-of-month) data and time-of-day data to the virtual tie trunk memory 21.

Figure 3:
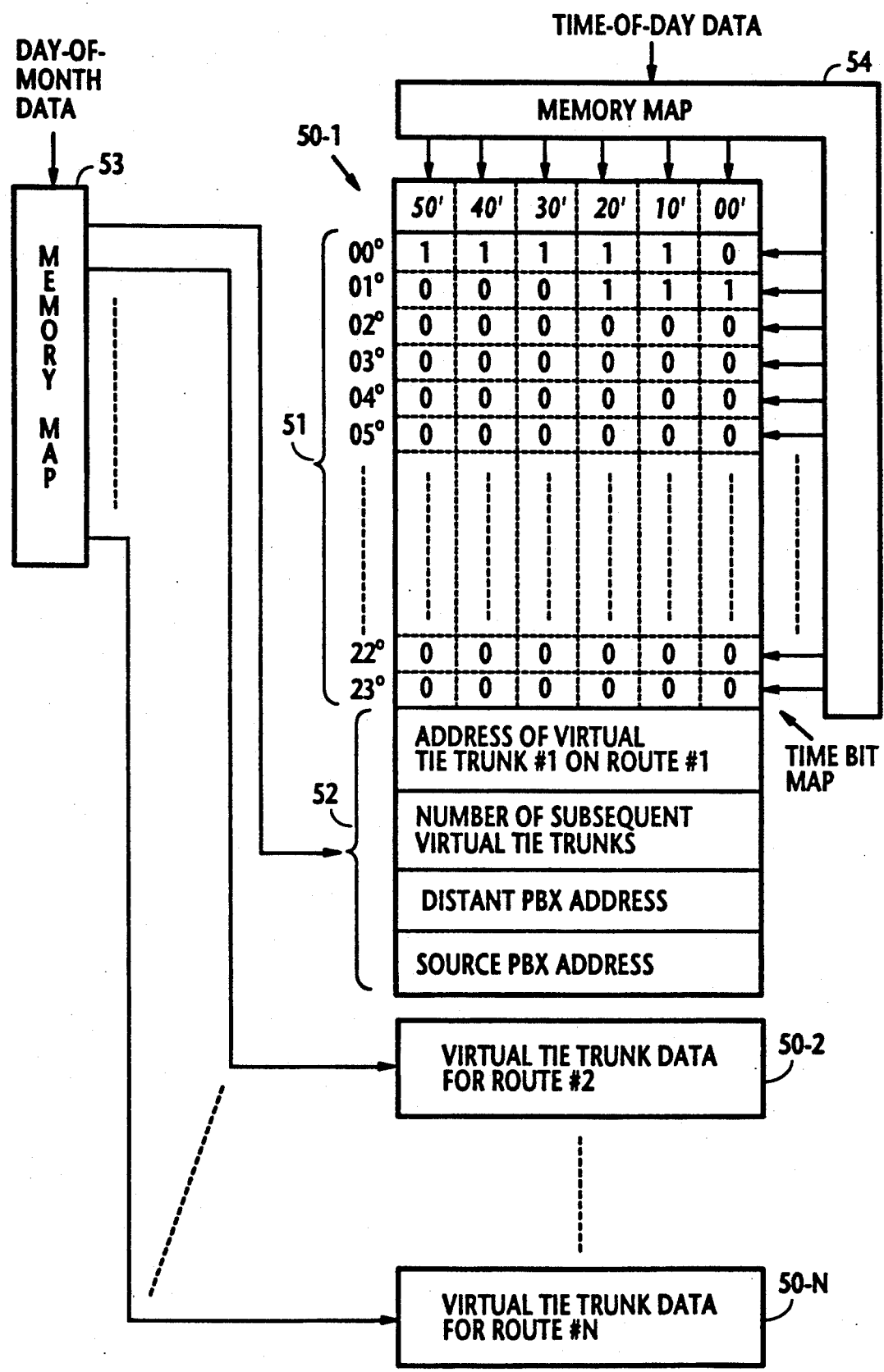
FIG. 3 is a view showing details of a virtual tie trunk memory.

As shown in FIG. 3, virtual tie trunk memory 21 has a plurality of storage areas 51-1 through 51-N which corresponds respectively to different traffic patterns of the virtual tie trunks. Each of the storage areas 51 is partitioned into a time bit map 51 and a routing field 52. The time bit map 51 is subdivided into cells arranged in a matrix array of 24 rows corresponding respectively to 00:00 to 23:00 time zones of the day and 6 columns corresponding respectively to 10-minute time-intervals of the hour. Binary 1 is stored in each cell to indicate the presence of virtual tie trunks during the time interval assigned to that cell and binary 0 is stored to indicate otherwise. The illustrated example indicates that virtual tie trunk #1 and its subsequent virtual tie trunks are established during a period from 00°:10' to 01°:29' from the own PBX to a distant PBX. Data stored in the routing field 52 includes the terminal address of virtual tie trunk #1 on route #1, and data indicating the number of subsequent virtual tie trunks of route #1, the address (identifier) of a distant PBX system and the address of the own (source) PBX system.

Virtual tie trunk memory 21 is provided with a memory map, or address decoder 53 which is responsive to the day-month-year data from the time-keeping device 21 to generate an address for accessing one of the storage areas 51, and a memory map 54 to generate an address for accessing one of the cells of the time bit map 51 in response to the time-of-day data. When a call setup or clearing signal is sent to the ISDN to set up or clear down the virtual tie trunks, the address of the #1 virtual tie trunk is carried on the channel identifier field of the message, the number-of-subsequent-trunks information is sent on the user-to-user information field, and the distant and source PBX addresses are inserted to the called-and-calling party field of the message.

In addition to the normal switching functions, the controller 17 performs programmed instructions as described in FIG. 4A to set up and clear down virtual tie trunks between adjacent PBX systems depending on time and calendar data supplied from time-keeping device 21. The program is triggered at periodic intervals (ten-minute intervals) to start execution at step 61 by reading stored data from a corresponding one of memory areas 50. Exit then is to step 62 to check to see if a binary 1 is present in a corresponding cell of time bit map 51. If the answer is affirmative, program execution branches at step 62 to step 63 to look up the channel status memory 20 to check to see if virtual tie trunks as indicated in the routing data field 52 are already established (working state) or not (nonworking state). If the answer is affirmative, control exits to the end of the program, and if negative, control branches to step 64 to send a call setup message to the ISDN network 40 through channel #24 (D-channel of the PRI trunk 47) containing all routing data stored in the routing data field 52 in a manner as mentioned earlier. Switched connections are established in the ISDN public network 45 on channels #20 through #23 according to CCITT Recommendation I.431 (Primary rate user-network interface) to be used later as 'virtual tie trunks'. The call setup message is passed through the drop-and-insert circuit 34 and D-channel controller 35 to controller 37 (step 71, FIG. 4B) in which it is decoded to update the status of channels #20 through #23 stored in the channel status memory 40 (step 72). Since the virtual tie trunks are not established, their current status is 'busy' (nonworking) to prevent them from being accessed by controller 37 so that the receipt of a call setup message from PBX 1 causes controller 37 to change their status to 'idle'. Controller 37 then generates a connect (ACK) message and transmits it through D-channel controller 35 and drop-and-insert circuit 34 on channel #24 to PBX 1, acknowledging receipt of the call setup message (step 73).

Following transmission of the call setup message, controller 17 of PBX 1 exits to step 65 to check for the presence of the connect (ACK) message. If the answer is negative, control returns to the starting point of the program to repeat the above process. If the answer is affirmative, control branches at step 65 to step 66 to change the working/nonworking status of channels #20 through #23 to 'working', and terminates the program execution.

If the answer is negative in decision step 62, control branches to step 67 to check to look up the channel status memory 20 to see if the virtual tie trunks remain established. If so, control branches at step 67 to step 68 to send a call clearing message to ISDN network 40 on the D-channel of the primary rate interface, containing the same routing data as those transmitted with the call setup message. In response to this call clearing message, all the virtual tie trunks are cleared by the ISDN according to the CCITT call clearing procedure. The call clearing message is relayed by the ISDN to controller 37 (step 71) to change the status of the virtual tie trunks stored in channel status memory 40 to 'nonworking' (step 72). A release message is then transmitted back to PBX 1 (step 73) through the PRI D-channel, acknowledging the receipt of the call clearing message. Control returns to step 61 if the release (ACK) message is not returned from PBX 2 (step 69). If this message is not returned, control exits to step 70 to change the status of channels #20 through #23 to 'nonworking'.

In this way, virtual tie trunks are dynamically established between two PBX systems according to estimated traffic volume.

When a user station in the PBX system 1 dials a special access code for tie-trunk calling to a user station at PBX 2, controller 17 first checks for the availability of trunk circuit 12 by examining its busy/idle status stored in control memory 18. If it is unavailable, controller 17 checks the status of B-channels #20 through #22 to see if at least one of the channels is in an idle state. If so, controller 17 selects an idle virtual tie trunk and directs VSC controller 16 to send a call setup message through PRI channel #23 to PBX 2, containing the address of the destination station, and directs switching matrix 10 to establish a connection from the requesting station to trunk circuit 13. The call setup message propagates through channel #23 and is received by VSC controller 36 and applied to controller 37. By examining the destination station address, controller 37 directs switching matrix 30 to establish a connection between trunk circuit 33 and the destination station.

Figure 5:
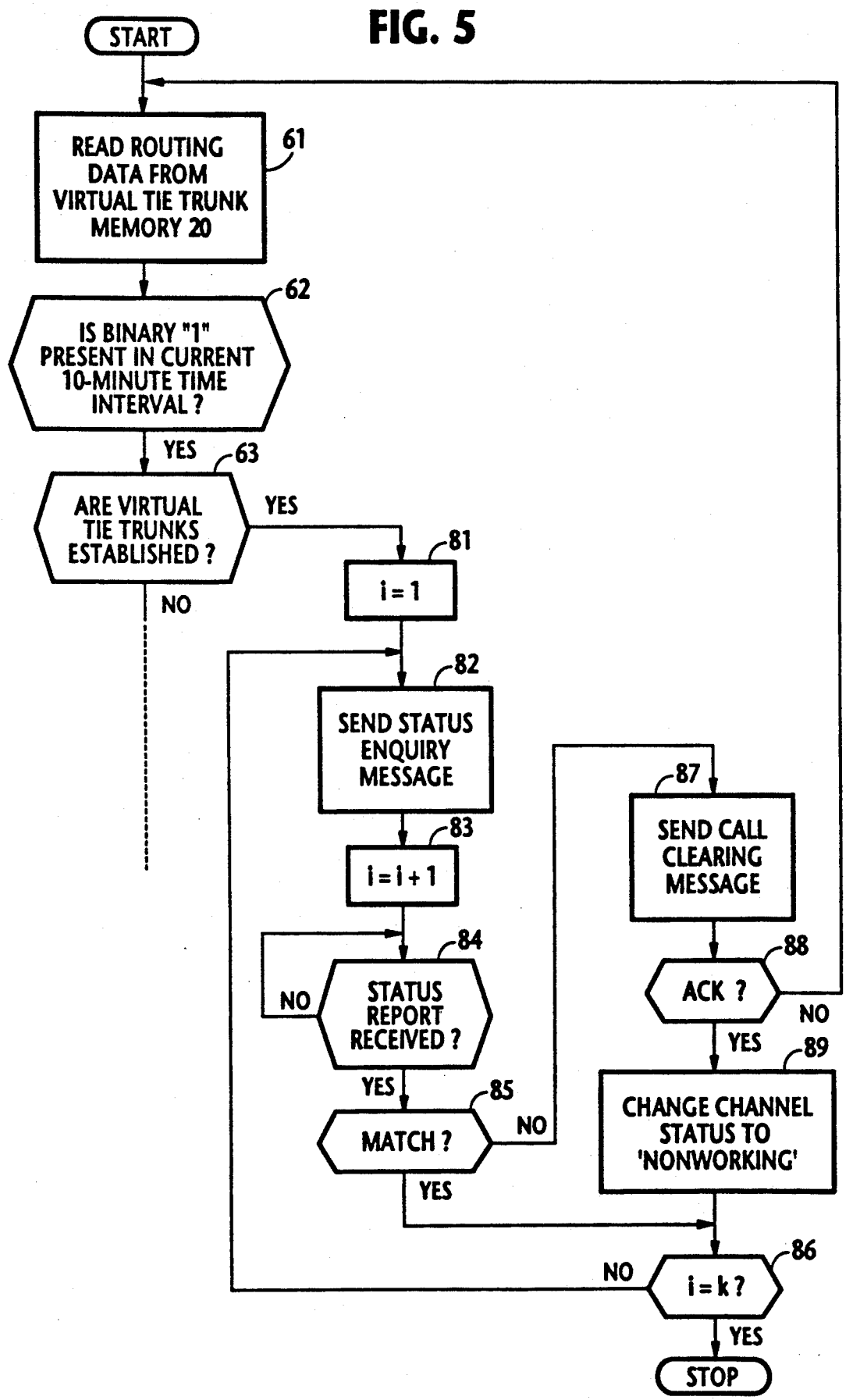
FIG. 5 is a flowchart of instructions performed by the controller of the master-side PBX system according to a preferred embodiment of this invention.

A modification of the present invention is shown in FIG. 5. According to this modification, a subroutine is provided between step 63 of FIG. 4A and the end of program. Following the affirmative decision indicating that virtual tie trunks are established, controller 17 branches at step 63 to an initialization step 81 to set variable i to 1 and proceeds to step 82 to cause virtual channel monitor 19 to send a status enquiry message to the ISDN via PRI channel #23, with control advancing to step 83 to increment variable i by one. This enquiry message requests the ISDN to return a status report indicating the working/nonworking status of virtual tie trunk 'i'. Controller 17 then fetches corresponding data from channel status memory 20 and checks to see if the status report given by the received message matches the status given by status memory 20 (step 85). If they match, control advances to step 86 to check to see if variable i is equal to k (maximum number of virtual speech-channel tie trunks). If i≠k, control returns to step 82 to repeat the above process, and if i=k, terminates the program execution.

If the status report mismatches the status stored in memory 20, the program execution branches at step 85 to step 87 to send a call clearing message through PRI D-channel (channel #24) to the ISDN network to clear the virtual tie trunk 'i'. This clearing message is received by PBX 2 (step 71, FIG. 4B) and the channel status is changed from 'working' to 'nonworking' (step 72) and an acknowledgment message is returned to PBX 1 (step 73). If the acknowledgment message is received (step 88), controller 17 branches to step 89 to change the corresponding channel status to 'nonworking', and proceeds to step 86. If it fails to receive acknowledgment message from PBX 2, control branches at step 88 to the starting point of the program.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A private switched communications system having a PBX (private branch exchange) system connected through a primary rate interface to an ISDN (Integrated Services Digital Network) public network, wherein the PBX system comprising:

memory means for storing routing data identifying a virtual tie trunk to be established by one of speech channels of the primary rate interface, first channel status data indicating set-up/clear-down command status of the virtual tie trunk, and second channel status data indicating working/nonworking status of said virtual tie trunk, said first channel status data being variable as a function of time and as a function of calendar day; and control means for accessing said first channel status data at periodic intervals, transmitting a call setup message or a call clearing message to said ISDN public network through a signaling channel of the primary rate interface to set-up or clear-down said virtual tie trunk between said PBX system and a distant PBX system according to contents of said first channel status data, receiving a response message from said distant PBX system, causing the working/nonworking status of said virtual tie trunk in said memory means to change according to said first channel status data following receipt of said response message, and causing a path to be established in said PBX systems to establish a connection from a user station of said PBX system to a user station of said distant PBX system via said virtual tie trunk in response to a call request when said working/nonworking status of said virtual tie trunk is indicative of the working state.

2. A private switched communications system as claimed in claim 1, wherein said first channel status data is stored in a bit map comprising a matrix array of cells each containing binary 1 or 0 indicating respectively the set-up or clear-down state of the virtual tie trunk, and wherein each column of the matrix array signifies a time span which is a fraction of one hour and each row of the matrix array signifies a portion of a twenty-four hour time span.

3. A private switched communications system as claimed in claim 1, wherein said PBX system includes means for checking the working/nonworking status of said virtual tie trunk to produce a status report, and wherein said control means includes means for transmitting a status enquiry message to said ISDN network to check the working/nonworking status of said virtual tie trunk with said ISDN network and receive a status report from the ISDN network, determining if the received status report matches or mismatches the status report of the PBX system, transmitting a call clearing message to said ISDN network when said status report is determined to be mismatched with the status report of the PBX system, and receiving a response message from said distant PBX system, causing the working/nonworking status of said virtual tie trunk in said memory means to change to nonworking state following reception of the last-mentioned response message.

4. A private switched communications system having first and second PBX (private branch exchange) systems connected through a respective primary rate interface to an ISDN (Integrated Services Digital Network) public network, said first PBX system comprising:

memory means for storing routing data identifying a virtual signaling tie trunk and a virtual speech tie trunk to be established by speech channels of the primary rate interface, first channel status data indicating set-up/clear-down command status of the virtual signaling and speech tie trunks, and second channel status data indicating working-/nonworking status of said virtual tie trunks, said first channel status data being variable as a function of time and as a function of calendar day; and control means for accessing said first channel status data at periodic intervals, transmitting a call setup message or a call clearing message to said ISDN public network through a signaling channel of the primary rate interface to set-up or clear-down said virtual signaling and speech tie trunks between the first and second PBX systems according to contents of said channel status data, receiving a response message from the distant PBX system, causing the working/nonworking status of said virtual signaling and speech tie trunks in said memory means to change according to said first channel status data following reception of said response message, causing a path to be established in the first PBX system from one of the user stations to one end of said virtual speech tie trunk in response to a call request therefrom when the status of said virtual speech tie trunk is indicative of the working state, and transmitting a call setup message to said second PBX system through said virtual signaling tie trunk to establish a path from the other end of the virtual speech tie trunk to a destination user station.

5. A private switched communications system as claimed in claim 4, wherein said first channel status data is stored in a bit map comprising a matrix array of cells each containing binary 1 or 0 indicating respectively the set-up or clear-down state of the virtual signaling and speech tie trunks, and wherein each column of the matrix array signifies a time span which is a fraction of one hour and each row of the matix array signifies a portion of a twenty-four hour time span.

6. A private switched communications system as claimed in claim 4, wherein said first PBX system includes means for checking the working/nonworking status of said virtual speech tie trunk to produce a status report, and wherein said control means includes means for transmitting a status enquiry message to said ISDN network to check the working/nonworking status of said virtual speech tie trunk with said ISDN network and receive a status report from the ISDN network, determining if the received status report matches or mismatches the status report of the first PBX system, transmitting a call clearing message to said ISDN network when said status report is determined to be mismatched with the status report of the first PBX system, and receiving a response message from said second PBX system, causing the working/nonworking status of said virtual speech tie trunk in said memory means of the first PBX system to change to nonworking state following reception of the last-mentioned response message.

7. A method for establishing a virtual tie trunk between first and second PBX (private branch exchange) systems each being connected through a respective primary rate interface to an ISDN (Integrated Services Digital Network) public network, the method comprising the steps of:

a) storing routing data identifying a virtual tie trunk to be established by one of the speech channels of said primary rate interfaces;

b) periodically generating channel status data indicating set-up or clear-down state of the virtual tie trunk, said channel status data being variable as a function of time and as a function of calendar day;

c) transmitting a call setup message or a call clearing message through a signaling channel of the primary rate interface of the first PBX system to said ISDN public network to set-up or clear-down said virtual tie trunk according to contents of the first channel status data;

d) receiving a response message from said second PBX system;

e) indicating working/nonworking status of said virtual tie trunk in said memory means according to said channel status data upon receipt of the response message; and f) establishing a path from one of said user stations to said virtual tie trunk in response to a request therefrom when said status of said virtual tie trunk is indicative of the working state.

8. A method for establishing virtual tie trunks between first and second PBX (private branch exchange) systems each being connected through a respective primary rate interface to an ISDN (Integrated Services Digital Network) public network, the method comprising the steps of:

a) storing routing data identifying a virtual signaling tie trunk and a virtual speech tie trunk to be established by ones of the speech channels of said primary rate interfaces;

b) periodically generating channel status data indicating set-up or clear-down state of the virtual signaling and speech tie trunks, said channel status data being variable as a function of time and as a function of calendar day;

c) transmitting a call setup message or a call clearing message to said ISDN public network to set-up or clear-down said virtual signaling and speech tie trunks through a signaling channel of the interface of the first PBX system according to contents of the channel status data;

d) receiving a response message from said second PBX system;

e) indicating working/nonworking status of said virtual tie trunk in said memory means according to said channel status data upon receipt of the response message;

f) establishing a path from one of said user stations of the first PBX system to one end of said virtual speech tie trunk in response to a request therefrom when said working/nonworking status of said virtual speech tie trunk is indicative of the working state; and g) transmitting a call setup message to said second PBX system through said virtual signaling tie trunk to cause a path to be established from the other end of the virtual speech tie trunk to a destination user station of the second PBX system.

* * * * *